E. L. OLSON.
HARROW ATTACHMENT.
APPLICATION FILED AUG. 29, 1916.
1,219,992.
Patented Mar. 20, 1917.
2 SHEETS—SHEET 1.
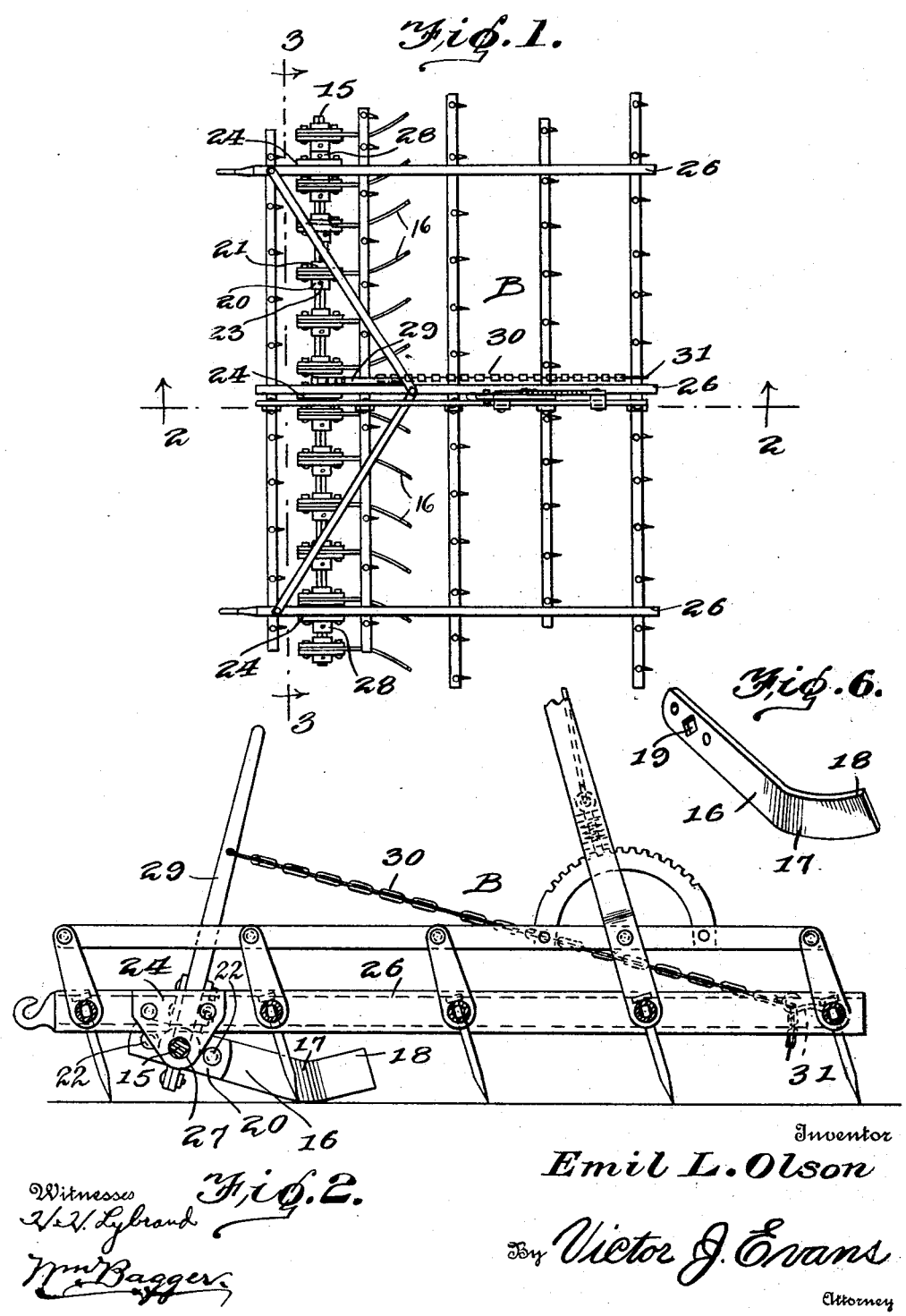
Witnesses
N. N. Lybrand
Wm. Bagger
Inventor
Emil L. Olson
By Victor J. Evans
Attorney

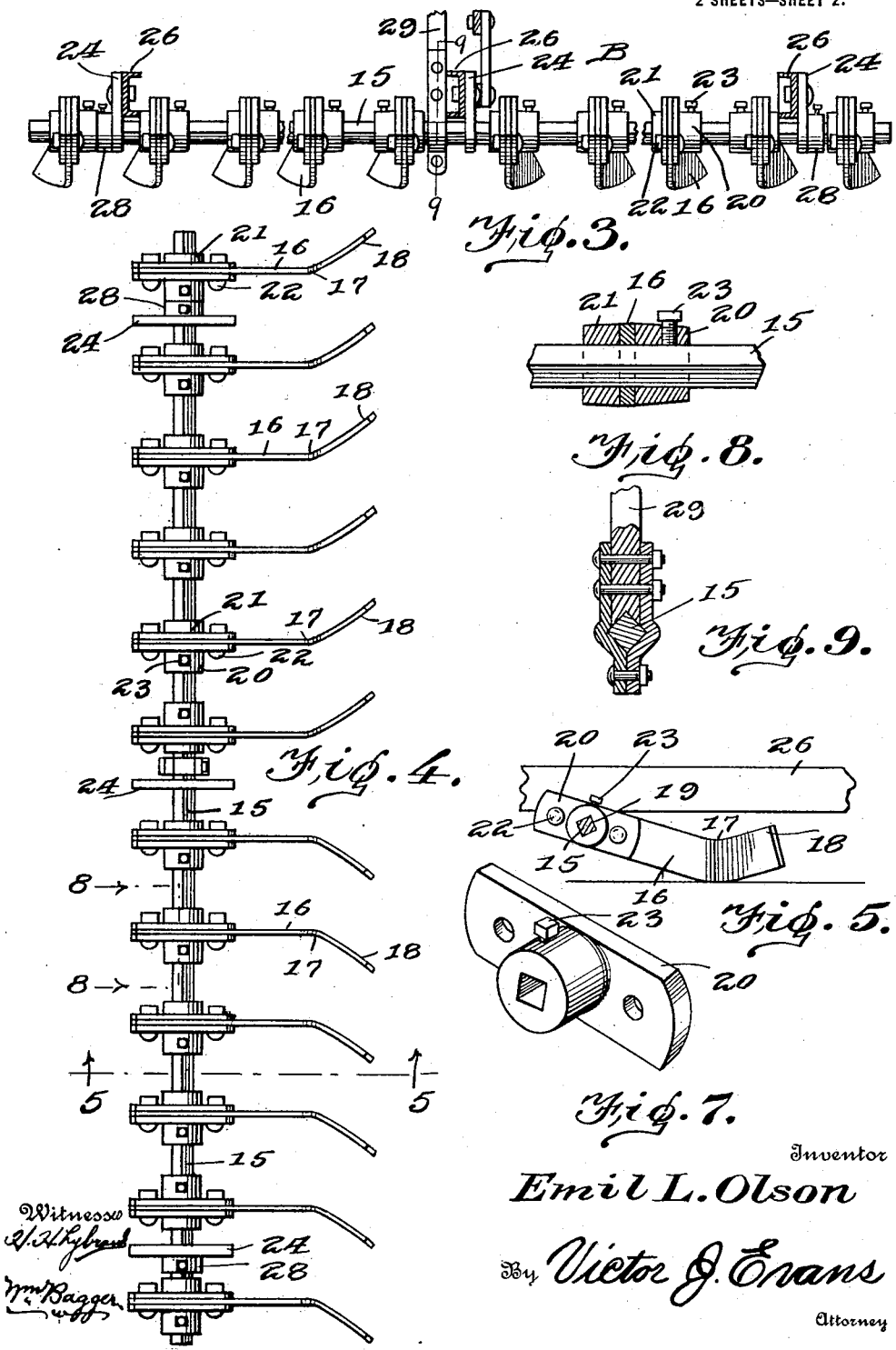

UNITED STATES PATENT OFFICE.

EMIL L. OLSON, OF KEARNEY, NEBRASKA.

HARROW ATTACHMENT.

1,219,992.  Specification of Letters Patent.  Patented Mar. 20, 1917.

Application filed August 29, 1916. Serial No. 117,527.

*To all whom it may concern:*

Be it known that I, EMIL L. OLSON, a citizen of the United States, residing at Kearney, in the county of Buffalo and State of Nebraska, have invented new and useful Improvements in Harrow Attachments, of which the following is a specification.

This invention relates to harrow attachments, and it has particular reference to a cutting and pulverizing attachment adapted to be mounted upon and used in connection with any spike tooth lever harrow of well known or conventional construction.

A further object of the invention is to produce a cutting and pulverizing attachment which may be manufactured and supplied at a moderate cost and which will be readily applicable to the harrow in connection with which it is to be used and which, when applied, will adapt itself to such adjustment as may be required.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:—

Figure 1 is a top plan view of a harrow section to which the invention has been applied.

Fig. 2 is a longitudinal sectional view taken on the line 2—2 in Fig. 1.

Fig. 3 is a transverse sectional view taken on the line 3—3 in Fig. 1.

Fig. 4 is a top plan view of the cutting and pulverizing device detached.

Fig. 5 is a sectional view taken on the line 5—5 in Fig. 4.

Fig. 6 is a perspective view of one of the cutting and pulverizing blades detached.

Fig. 7 is a perspective view of one of the clamps for mounting the blade in position.

Fig. 8 is a sectional detail view taken on the line 8—8 in Fig. 4.

Fig. 9 is a sectional detail view taken on the line 9—9 in Fig. 3.

Corresponding parts in the several figures are denoted by like characters of reference.

The improved attachment includes a supporting shaft or bar 15 of rectangular cross section, the same consisting preferably of a square iron or steel bar of suitable length and cross sectional dimensions. Mounted on the bar 15 are a plurality of blades 16, each blade consisting of a flat steel plate of relatively long and narrow formation, the same being bent laterally, as seen at 17, and upwardly, as seen at 18, the bent portion being also preferably slightly twisted to combine the desired cutting action with the requisite soil moving action. All of the blades mounted on the bar 15 may be bent laterally in one direction, but the blades are preferably constructed and arranged as seen in Fig. 4, that is to say, with one half of the blades bent to the right and the other half to the left so as to move the dirt slightly in two directions with respect to the central medial line of the harrow in connection with which the device is used. Each blade 16 has a square or rectangular eye 19 enabling it to be placed on the bar 15. To secure the blades in position, clamping devices are employed, each of said devices consisting of two clamp members 20, 21 that are mounted on the bar 15 adjacent to opposite sides of the blade 16, said clamp members and blade being apertured for the reception of connecting bolts 22. The clamp member 20 also has a set screw 23 which may be tightened on the bar 15, thereby securing the clamping device as well as the blade against displacement lengthwise of the bar. The blades may be placed as closely together as may be desired, and it is obvious that any desired number of blades may be placed on a bar of a certain length.

To mount the improved device in position on a harrow section, such harrow section having been conventionally indicated at B in Figs. 1, 2 and 3 of the drawings, bearing members 24 are employed, said bearing members being bolted or otherwise secured on the side bars 26 of the harrow section, and said bearing members having circular openings 27 affording bearings for the bar 15. The bar 15, after being mounted in the bearings, is secured against lateral lengthwise displacement by means of set collars 28. The bar 15 is also provided with a lever 29 mounted thereon by a clamping device which may be of similar construction to that utilized for securing the cutting blades in position. The lever 29 is connected by a chain 30 with a hook 31 on the harrow frame, and it will be readily seen that by lengthening or shortening the chain the bar or shaft 15 may be permitted to rock in its bearings, thereby varying the set or adjustment of the cutting blades.

The operation and advantages of this invention will be readily understood from the foregoing description taken in connection with the drawings. It will be seen that I have produced a very simple and inexpensive cutting and pulverizing device which may be readily applied to and used in connection with a spike tooth harrow of well known and conventional construction. It will be understood that when a harrow consisting of a number of sections is used, each section will be supplied with one of the improved attachments.

It has been found that when the soil is dry and baked owing to prolonged drought the ordinary spike tooth harrow is inefficient to crush the clods and pulverize the dirt to such an extent as to produce a smooth and perfect seed bed. Under such conditions it has been customary to employ additional implements, such as a roller, a disk harrow or a soil pulverizer separate from the harrow for the purpose of producing the desired result. It has thus been necessary not only to go twice over the ground, but also to provide a special implement at a considerable expense. The improved device which is the subject of the present invention is extremely simple in construction and, therefore, inexpensively produced, and when applied to a harrow it will at a single operation attain the desired results of crushing, pulverizing and mellowing the soil to produce a thoroughly efficient and desirable seed bed.

Having thus described the invention, what is claimed as new, is:—

1. A harrow attachment consisting of a bar square in cross section, blades having square eyes engaging the bar, clamp devices each comprising two bar engaging members fitted adjacent to opposite faces of a blade, and bolts connecting the members and extending through the blade, and means for securing the clamping device on the bar.

2. In a harrow attachment, a rockingly supported bar of square cross section, a plurality of cutting blades clamped and adjustably mounted on said bar, a lever clamped upon and radially extending from said bar, bearing members fixed on a harrow frame to support the bar, set collars on the bar to secure it against lengthwise displacement, and a chain adjustably connecting the lever with the harrow frame to force the cutting blades in a groundward direction.

In testimony whereof I affix my signature.

EMIL L. OLSON.

Copies of this patent may be obtained for five cents each, by addressing the "Commissioner of Patents, Washington, D. C."